(12) United States Patent
Hwangbo et al.

(10) Patent No.: US 12,100,847 B2
(45) Date of Patent: Sep. 24, 2024

(54) CYLINDRICAL BATTERY CELL, AND BATTERY PACK AND VEHICLE COMPRISING SAME

(71) Applicant: LG ENERGY SOLUTION, LTD., Seoul (KR)

(72) Inventors: Kwang-Su Hwangbo, Daejeon (KR); Do-Gyun Kim, Daejeon (KR); Geon-Woo Min, Daejeon (KR); Hae-Jin Lim, Daejeon (KR); Min-Ki Jo, Daejeon (KR); Su-Ji Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/031,847

(22) PCT Filed: Dec. 24, 2021

(86) PCT No.: PCT/KR2021/019897
§ 371 (c)(1),
(2) Date: Apr. 13, 2023

(87) PCT Pub. No.: WO2022/145910
PCT Pub. Date: Jul. 7, 2022

(65) Prior Publication Data
US 2023/0387513 A1    Nov. 30, 2023

(30) Foreign Application Priority Data
Dec. 29, 2020   (KR) ........................ 10-2020-0186476

(51) Int. Cl.
*H01M 50/107* (2021.01)
*H01M 50/213* (2021.01)

(52) U.S. Cl.
CPC ....... *H01M 50/107* (2021.01); *H01M 50/213* (2021.01); *H01M 2220/20* (2013.01)

(58) Field of Classification Search
CPC ............. H01M 50/107; H01M 50/213; H01M 2220/20
See application file for complete search history.

(56) References Cited

U.S. PATENT DOCUMENTS

2011/0171515 A1   7/2011   Itoi et al.
2014/0370367 A1*  12/2014  Higuchi ............... H01M 50/211
                                                      429/158

(Continued)

FOREIGN PATENT DOCUMENTS

EP   2 626 925 A2    8/2013
EP   3 547 392 A1   10/2019

(Continued)

OTHER PUBLICATIONS

JP2002141028MT (Year: 2002).*

(Continued)

*Primary Examiner* — Alexander Usyatinsky
(74) *Attorney, Agent, or Firm* — Birch, Stewart, Kolasch & Birch, LLP

(57) ABSTRACT

A cylindrical battery cell includes an electrode assembly including a first electrode tab and a second electrode tab, a battery can in which the electrode assembly is received, the battery can being electrically connected to the second electrode tab, a top cap to cover a top opening of the battery can, the top cap being electrically connected to the first electrode tab and electrically insulated from the battery can, and a terminal extension member coupled to a top of the battery can and electrically insulated from the top cap.

43 Claims, 16 Drawing Sheets

(56) References Cited

U.S. PATENT DOCUMENTS

| | | | |
|---|---|---|---|
| 2019/0109302 A1* | 4/2019 | Zheng | H01M 50/567 |
| 2019/0386272 A1* | 12/2019 | Shin | H01M 50/169 |
| 2021/0075051 A1 | 3/2021 | Zhou | |
| 2021/0083333 A1 | 3/2021 | Lee et al. | |
| 2021/0257704 A1 | 8/2021 | Sawada et al. | |

FOREIGN PATENT DOCUMENTS

| | | | |
|---|---|---|---|
| JP | 2000-58024 A | | 2/2000 |
| JP | 2002-141028 A | | 5/2002 |
| JP | 5019557 B2 | | 9/2012 |
| JP | 2002141028 | * | 12/2014 |
| JP | 3229347 U | | 12/2020 |
| KR | 20120062254 | * | 5/2002 |
| KR | 10-1473391 B1 | | 12/2014 |
| KR | 10-2018-0043996 A | | 5/2018 |
| KR | 10-2018-0129115 A | | 12/2018 |
| KR | 1020180129115 | * | 12/2018 |
| KR | 10-2019-0030016 A | | 3/2019 |
| KR | 10-2019-0076698 A | | 7/2019 |
| WO | WO2011/007508 A1 | | 1/2011 |
| WO | WO2019/244392 A1 | | 12/2019 |

OTHER PUBLICATIONS

KR 20120062254MT (Year: 2012).*
International Search Report issued in PCT/KR2021/019897 (PCT/ISA/210), mailed on Apr. 19, 2022.
Partial Supplementary European Search Report for European Application No. 21915708.8, dated Jul. 30, 2024.

* cited by examiner

CYLINDRICAL BATTERY CELL, AND BATTERY PACK AND VEHICLE COMPRISING SAME

TECHNICAL FIELD

The present disclosure relates to a cylindrical battery cell having a structure in which positive and negative electrode terminals are formed in the same direction, and a battery pack and a vehicle comprising the same. More particularly, the present disclosure relates to a cylindrical battery cell having a structure in which positive and negative electrode terminals are arranged adjacent to each other on one side of the cylindrical battery cell without greatly changing the structure of the conventional cylindrical battery cell, and a battery pack and a vehicle comprising the same.

The present application claims the benefit of Korean Patent Application No. 10-2020-0186476 filed on Dec. 29, 2020 with the Korean Intellectual Property Office, the disclosure of which is incorporated herein by reference in its entirety.

BACKGROUND ART

When manufacturing a battery pack using cylindrical battery cells, in general, the plurality of cylindrical battery cells is placed upright in a housing and electrically connected to each other using the top and bottom thereof as positive and negative electrode terminals, respectively.

In the cylindrical battery cell, a negative electrode non-coated region of an electrode assembly received in a battery can extends downward and is electrically connected to the bottom of the battery can, and a positive electrode noncoated region extends upward and is electrically connected to a top cap. That is, in the cylindrical battery cell, it is general that the bottom of the battery can is used as the negative electrode terminal, and the top cap that covers the top opening of the battery can is used as the positive electrode terminal.

However, when the positive electrode terminal and the negative electrode terminal of the cylindrical battery cell are disposed on the opposite sides, it is necessary to apply an electrical connection component for electrically connecting the plurality of cylindrical battery cells, for example, busbars, to both the top and bottom of the cylindrical battery cells. This makes an electrical connection structure of the battery pack complex.

Besides, under this structure, a component for insulation and a component for waterproofing should be individually applied to the top and bottom of the battery pack, causing the increased number of components applied and structural complexity.

Accordingly, there is a need for the development of a cylindrical battery cell having a structure in which the positive electrode terminal and the negative electrode terminal are applied in the same direction to simplify the electrical connection structure of the plurality of cylindrical battery cells.

DISCLOSURE

Technical Problem

The present disclosure is designed to solve the above-described problem, and therefore the present disclosure is directed to providing a cylindrical battery cell structure in which positive and negative electrode terminals are applied in the same direction.

In another aspect, the present disclosure is directed to providing a cylindrical battery cell in which the negative electrode terminal applied in the same direction has a sufficient area for welding with an electrical connection component such as busbars for the fabrication of a battery pack.

In still another aspect, the present disclosure is directed to providing a cylindrical battery cell with reduced volume occupied by an electrode assembly in a battery can.

However, the technical problem of the present disclosure is not limited to the above-described problem, and other problems not mentioned herein will be clearly understood by those skilled in the art from the following description.

Technical Solution

To solve the above-described problem, a cylindrical battery cell according to an embodiment of the present disclosure includes an electrode assembly including a first electrode tab and a second electrode tab; a battery can configured to receive the electrode assembly therein, the battery can being electrically connected to the second electrode tab; a top cap configured to cover a top opening of the battery can, the top cap being electrically connected to the first electrode tab and electrically insulated from the battery can; and a terminal extension member which is-coupled to a top of the battery can, the terminal extension member being electrically insulated from the top cap.

The terminal extension member may extend inward along a radial direction of the cylindrical battery cell at the top of the battery can.

The terminal extension member may have a larger width than a flat portion formed by the top of the battery can.

The battery can may include a crimping portion extending inward along a radial direction of the cylindrical battery cell from an upper periphery of the battery can.

The terminal extension member may be coupled to an upper surface of the crimping portion.

A flat portion may be provided on an upper surface of the crimping portion, and the terminal extension member may be coupled on the flat portion of the crimping portion.

The terminal extension member may have a larger width than a width of the flat portion of the crimping portion.

The terminal extension member may have a shape of a washer having a hole at a center thereof.

The top cap may include a protrusion protruding upwards from the center, and the protrusion may be provided at a location corresponding to the hole formed at the center of the terminal extension member.

The protrusion may protrude upwards above an upper surface of the terminal extension member.

The cylindrical battery cell may further include a terminal insulation member interposed between the top cap and the terminal extension member to electrically insulate the top cap from the terminal extension member.

The terminal insulation member may have a shape of a washer having a hole at a center thereof.

The top cap may include a protrusion protruding upwards from the center, and the terminal insulation member may include a first part interposed between a lower surface of the terminal extension member and an upper surface of a remaining area of the top cap except the protrusion in the top cap; and a second part protruding upwards from the first part, the second part being interposed between an inner surface of the hole formed at the center of the terminal extension member and the protrusion.

The battery can may include a crimping portion extending inward along a radial direction of the cylindrical battery cell at an upper periphery of the battery can, and an upper surface of the first part may be disposed at a same height as an upper surface of the crimping portion.

The second part may have an inner diameter corresponding to an outer diameter of the protrusion.

The outer diameter of the protrusion may gradually decrease as it goes upwards, and the inner diameter of the second part may correspond to the outer diameter of a lower end of the protrusion.

The terminal extension member may have an inner diameter corresponding to an outer diameter of the second part.

A thickness of the crimping portion at an area having the flat portion may be larger than a thickness at a remaining area of the crimping portion.

The second part may be extended to cover part of the upper surface of the top cap.

The terminal extension member and the terminal insulation member may be an assembly formed by insert molding.

An upper surface of the crimping portion may have an insertion protrusion or an insertion groove, and a lower surface of the terminal extension member may have an insertion groove coupled to the insertion protrusion of the crimping portion or an insertion protrusion which is coupled to the insertion groove of the crimping portion.

The terminal insulation member may include a resin material, and may be coupled to the terminal extension member and the top cap by heat fusion.

The electrode assembly may have a jellyroll structure in which a stack is wound in a winding direction, the stack including a first electrode, a second electrode, and a separator interposed between the first electrode and the second electrode.

The first electrode tab may be a first noncoated region in which an electrode active material is not coated at an upper end of the first electrode, and the second electrode tab may be a second noncoated region in which an electrode active material is not coated at a lower end of the second electrode.

At least part of the first electrode tab may include a plurality of first segments split along the winding direction of the electrode assembly.

The plurality of first segments may be bent along a radial direction of the electrode assembly.

The cylindrical battery cell may further include a first current collector plate coupled to the electrode assembly and electrically connected to the top cap, and the first current collector plate may be coupled to a coupling surface formed by the bending of the plurality of first segments.

The plurality of first segments may overlap in multiple layers, the first electrode tab may include a target weld area in which a number of overlapping layers of the plurality of first segments is uniformly maintained along the radial direction of the electrode assembly, and the first current collector plate may be coupled to the first electrode tab in the target weld area.

At least part of the second electrode tab may include a plurality of second segments split along a winding direction of the electrode assembly.

The plurality of second segments may be bent along the radial direction of the electrode assembly.

The cylindrical battery cell may further include a second current collector plate coupled below the electrode assembly and electrically connected to the battery can, and the second current collector plate may be coupled on to a coupling surface formed by the bending of the plurality of second segments.

The plurality of second segments may overlap in multiple layers, the second electrode tab may include a target weld area in which a number of overlapping layers of the plurality of second segments is uniformly maintained along the radial direction of the electrode assembly, and the second current collector plate may be coupled to the second electrode tab in the target weld area.

The cylindrical battery cell may further include a first current collector plate coupled to the electrode assembly and electrically connected to the top cap.

The first current collector plate may include a plurality of tab coupling portions extended radially from a center thereof.

The first current collector plate may further include a lead between the two adjacent tab coupling portions to electrically connect the first current collector plate to the top cap.

The battery can may include a beading portion press-fit along a periphery of an outer peripheral surface thereof, and the first current collector plate may be disposed between the electrode assembly and the beading portion.

A maximum outer diameter of the first current collector plate may be equal to or smaller than an inner diameter of the battery can at a height at which the beading portion is formed.

The first current collector plate may have a first current collector plate hole formed at a location corresponding to a hole formed at a winding center of the electrode assembly.

A diameter of the first current collector plate hole may be equal to or larger than a diameter of the hole formed at the winding center of the electrode assembly.

The battery can may include a closed portion located at a lower end opposite the top opening, and the closed portion may include a venting portion that is configured to rupture when an internal pressure of the battery can increases above a reference value.

The venting portion may be configured to have a smaller thickness than a surrounding area of the closed portion.

The venting portion may be formed by notching one or opposite surfaces of the closed portion.

The cylindrical battery cell may further include an insulator interposed between the beading portion and the first current collector plate.

The insulator may be interposed between the first electrode tab of the electrode assembly and an inner peripheral surface of the battery can.

Meanwhile, to solve the above-described problem, a battery pack according to an embodiment of the present disclosure includes a plurality of cylindrical battery cells of the present disclosure as described above.

The plurality of cylindrical battery cells may be arranged in a predetermined number of columns, and the top cap and the terminal extension member provided in each cylindrical battery cell may be positioned upwards.

The battery pack may include a plurality of busbars to connect the plurality of cylindrical battery cells in series and in parallel, the plurality of busbars may be positioned on the plurality of cylindrical battery cells, and each busbar may include a body extending between adjacent cylindrical battery cells; a plurality of first busbar terminals extending in a first direction from the body and electrically coupled to the top caps of the cylindrical battery cells disposed in the first direction; and a plurality of second busbar terminals extending in a second direction opposite the first direction from the body and electrically coupled to the terminal extension members of the cylindrical battery cells disposed in the second direction.

Meanwhile, a vehicle according to an embodiment of the present disclosure includes at least one battery pack according to an embodiment of the present disclosure.

Advantageous Effects

According to an aspect of the present disclosure, there is provided a cylindrical battery cell structure in which positive and negative electrode terminals are applied in the same direction, and thus it is possible to simplify an electrical connection structure of a plurality of cylindrical battery cells and minimize the volume of a battery pack, thereby improving the energy density of the battery pack.

According to another aspect of the present disclosure, since the negative electrode terminal of the cylindrical battery cell has a sufficient area for welding with an electrical connection component such as busbars, it is possible to ensure a sufficient joining strength between the negative electrode terminal and the electrical connection component, and reduce the resistance at the joint area between the electrical connection component and the negative electrode terminal to a desirable level.

According to still another aspect, it is possible to minimize the volume occupied by the electrode assembly in the battery can, thereby improving the energy density of the cylindrical battery cell.

DESCRIPTION OF DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

BEST MODE

Figure 1:
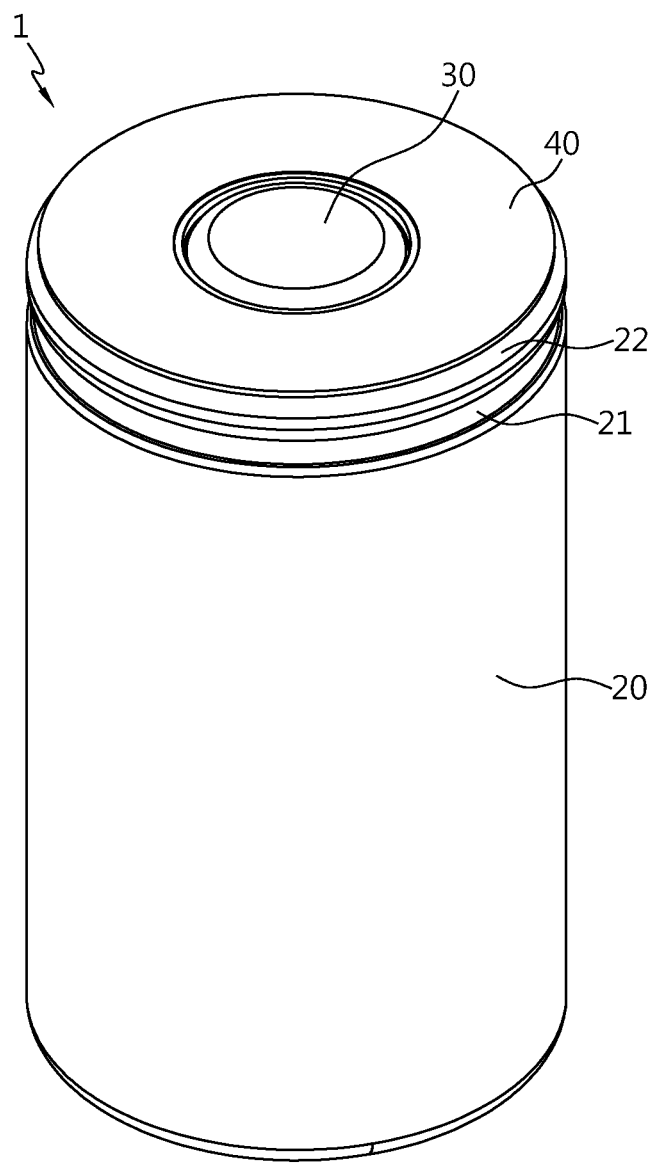
FIG. 1 is a diagram showing a cylindrical battery cell according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation. Therefore, the embodiments described herein and illustrations shown in the drawings are just some of the most preferred embodiments of the present disclosure, but not intended to fully describe the technical aspects of the present disclosure, so it should be understood that a variety of other equivalents and modifications could have been made thereto at the time that the application was filed.

Figure 2:
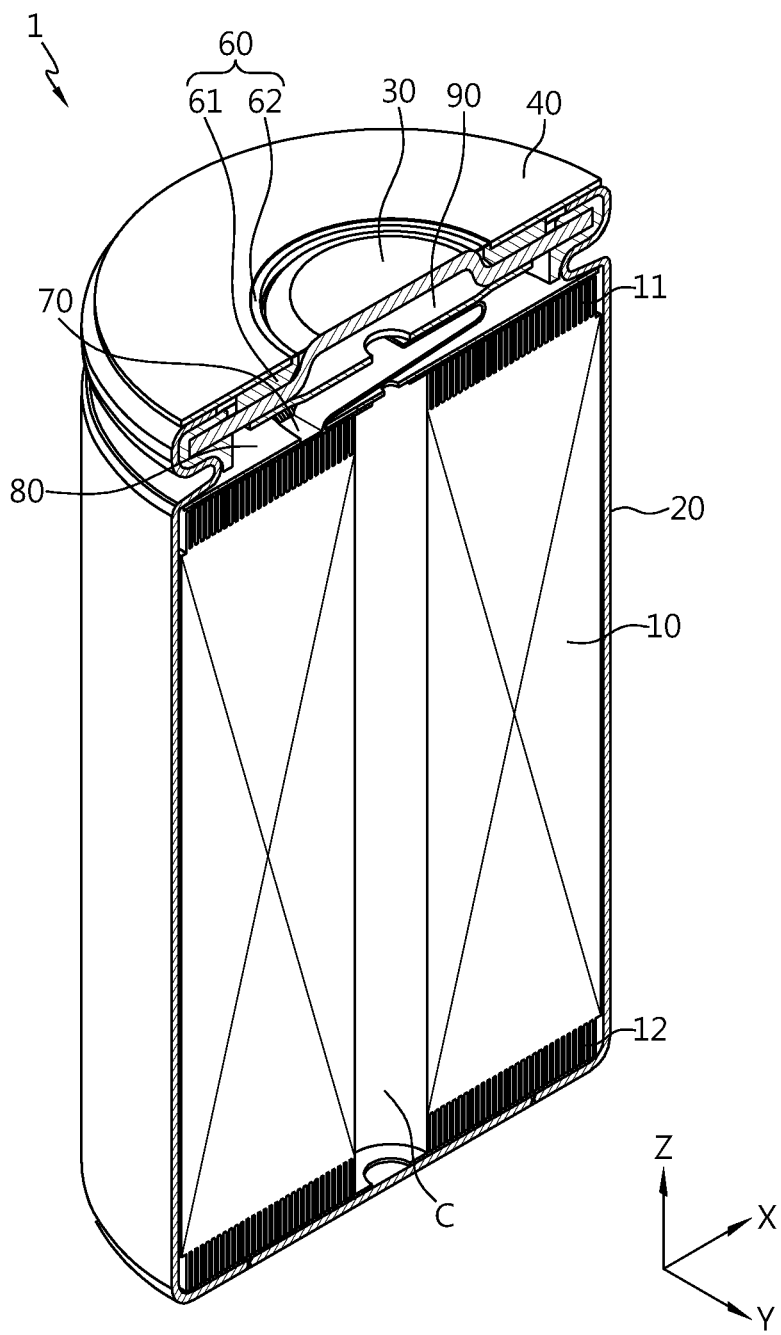
FIG. 2 is a cross-sectional view showing an internal structure of a cylindrical battery cell according to an embodiment of the present disclosure.
Figure 3:
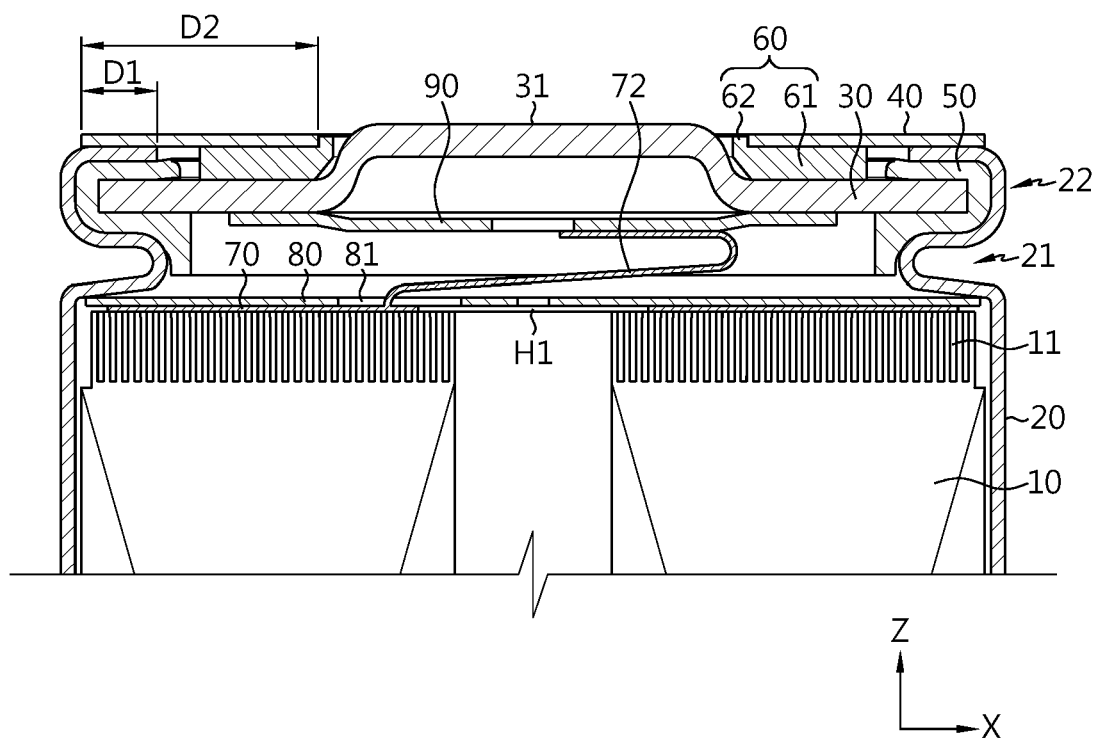
FIGS. 3 to 5 are partial cross-sectional views showing an upper part structure of a cylindrical battery cell according to an embodiment of the present disclosure.

Referring to FIGS. 1 to 3, a cylindrical battery cell 1 according to an embodiment of the present disclosure includes an electrode assembly 10, a battery can 20, a top cap 30 and a terminal extension member 40. In addition to the above-described components, the cylindrical battery cell 1 may further include a sealing gasket 50 and/or a terminal insulation member 60 and/or a first current collector plate 70 and/or a second current collector plate 70' and/or an insulator 80 and/or a connecting plate 90.

Referring to FIGS. 1 to 4, the electrode assembly 10 includes a first electrode having a first polarity, a second electrode having a second polarity and a separator interposed between the first electrode and the second electrode. The electrode assembly may have a jelly-roll structure. That is, the electrode assembly 10 may be manufactured by winding a stack formed by stacking the first and second electrodes having a sheet shape with the separator interposed between the first and second electrodes at least once in a direction with respect to a winding center C. In this case, an additional separator may be provided on the outer peripheral surface of the electrode assembly 10 for insulation between the electrode assembly 10 and the battery can 20. Any known jelly-roll structure may be used in the present disclosure without limitation. The first electrode is a positive or negative electrode, and the second electrode corresponds to an electrode having the opposite polarity to the first electrode.

The first electrode includes a first electrode current collector and a first electrode active material coated on one or both surfaces of the first electrode current collector. The first electrode has a noncoated region (a first noncoated region) in which the electrode active material is not coated at the upper end. That is, the noncoated region (the first noncoated region) in which the first electrode active material is not coated exists at one end of the first electrode current collector in the widthwise direction (a direction parallel to the Z axis). The noncoated region itself may act as a first electrode tab 11. The first electrode tab 11 is provided on the electrode assembly 10 received within the battery can in the heightwise direction (the direction parallel to the Z axis). That is, the first electrode current collector includes the first noncoated region where the active material layer is not coated at the end of the long side and the separator is exposed, and at least part of the first noncoated region itself is used as an electrode tab. The first electrode tab may be, for example, a positive electrode tab.

Figure 12:
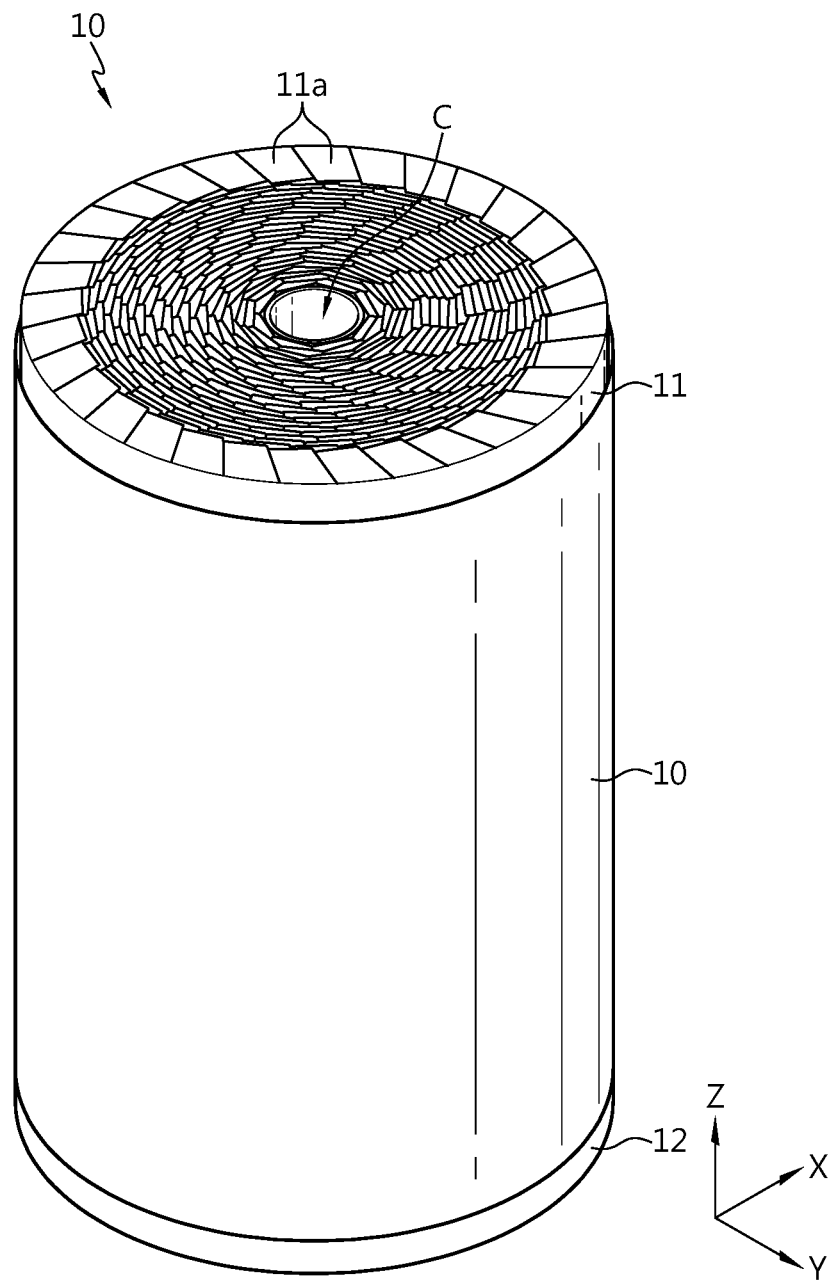
FIG. 12 is a diagram showing an electrode assembly having a bent noncoated region according to an embodiment of the present disclosure.

Meanwhile, referring to FIG. 12, the structure of the electrode assembly 10 according to an embodiment of the present disclosure is shown. Referring to FIG. 12, part of the first electrode tab 11, i.e., at least part of the first noncoated region may include a plurality of first segments 11a split along the winding direction of the electrode assembly 10. The first segments 11a may be bent along the radial direction of the electrode assembly 10, and in this case, the plurality of first segments 11a may overlap in multilayer. In this case, the first current collector plate 70 as described below may be coupled to an area in which the plurality of first segments 11a overlaps in multilayer. Meanwhile, the electrode assembly 10 may have a target weld area in which the number of overlapping layers of the first segments 11a is uniformly maintained along the radial direction of the electrode assembly 10. In this area, the number of overlapping layers is kept to a maximum, and thus preferably, welding between the first current collector plate 70 as described below and the first electrode tab 11 is performed in this area.

For example, in case that laser welding is applied, it is possible to prevent damage to the electrode assembly 10 due to the laser beam passing through the first electrode tab 11 when increasing the laser output to improve the welding quality. Additionally, it is possible to effectively prevent the infiltration of impurities, for example, weld spatter, into the electrode assembly 10.

Referring to FIG. 12, the second electrode includes a second electrode current collector and a second electrode active material coated on one or both surfaces of the second electrode current collector. The second electrode has a noncoated region (a second noncoated region) in which the electrode active material is not coated at the lower end. That is, the noncoated region in which the second electrode active material is not coated exists at the other end of the second electrode current collector in the widthwise direction (the direction parallel to the Z axis). The noncoated region itself may act as a second electrode tab 12. The second electrode tab 12 is provided below the electrode assembly 10 received within the battery can 20 in the heightwise direction (the direction parallel to the Z axis). That is, the second electrode current collector includes the second noncoated region where the active material layer is not coated at the end of the long side and the separator is exposed, and at least part of the second noncoated region itself is used as an electrode tab. The second electrode tab 12 may be, for example, a negative electrode tab.

Although FIG. 12 shows the segments formed in the first electrode tab 11, such segments may be also formed in the second electrode tab 12. That is, part of the second electrode tab 12, i.e., at least part of the second noncoated region may include a plurality of second segments (not shown) split along the winding direction of the electrode assembly 10. The second segments may be bent along the radial direction of the electrode assembly 10, and in this case, the plurality of second segments may overlap in multilayer. In this case, the second current collector plate 70' as described below may be coupled to an area in which the plurality of second segments overlaps in multilayer. Meanwhile, the electrode assembly 10 may have a target weld area in which the number of overlapping layers of the second segments is uniformly maintained along the radial direction of the electrode assembly 10. In this area, the number of overlapping layers is kept to a maximum, and thus preferably, welding between the second current collector plate 70' as described below and the second electrode tab 12 is performed in this area.

For example, in case that laser welding is applied, it is possible to prevent damage to the electrode assembly 10 due to the laser beam passing through the second electrode tab 12 when increasing the laser output to improve the welding quality. Additionally, it is possible to effectively prevent the infiltration of impurities, for example, weld spatter, into the electrode assembly 10.

The first electrode tab 11 and the second electrode tab 12 may be extended in the opposite directions along the heightwise direction (the direction parallel to the Z axis) of the cylindrical battery cell 1. In this case, the first electrode tab 11 is extended to an opening formed at the upper end of the battery can 20, and the second electrode tab 12 is extended to a closed portion at the lower end of the battery can 20.

Referring to FIGS. 1 to 4, the battery can 20 is an approximately cylindrical receiving structure having the top opening, and is made of a metal material having conductive properties. The battery can 20 receives the electrode assembly 10 through the top opening, and receives an electrolyte together. The sidewall and the bottom closed portion of the battery can 20 may be integrally formed, and may be individually formed and coupled to each other by welding.

The battery can 20 is electrically connected to the second electrode tab 12 of the electrode assembly 10. Accordingly, the battery can 20 has the same polarity as the second electrode tab 12. For example, the electrical connection between the electrode assembly 10 and the battery can 20 may be made through the second current collector plate 70'.

The battery can 20 includes a beading portion 21 and/or a crimping portion 22 at the upper end. The beading portion 21 is adjacent to the top opening of the battery can 20. The beading portion 21 is recessed along the periphery of the outer peripheral surface of the battery can 20. That is, the beading portion 21 is formed by press-fitting the periphery of the outer peripheral surface of the battery can 20. Accordingly, the beading portion 21 is recessed to a predetermined depth along the radial direction from the outer peripheral surface of the battery can 20, and is extended along the circumferential direction of the battery can 20. The beading portion 21 may prevent the electrode assembly 10 having a size corresponding to the width of the battery can 20 from slipping out of the top opening of the battery can 20, and may act as a support on which the top cap is seated.

The crimping portion 22 may be formed at the upper end of the battery can 20. The crimping portion 22 may be extended inwards along the radial direction of the cylindrical battery cell 1 from the upper periphery of the battery can 20. The crimping portion 22 is provided at an area corresponding to the periphery edge of the upper surface of the top cap 30 to fix the top cap 30, thereby preventing the top cap 30 from moving upwards out of position. When the battery can 20 includes the beading portion 21, the crimping portion 22 is formed on the beading portion 21. The crimping portion 22 is extended from the beading portion 21, and is extended and bent to surround the outer peripheral surface of the top cap 30 positioned on the beading portion 21 and part of the upper surface of the top cap 30. The upper end of the crimping portion 22 may be extended inwards a predetermined distance along the radial direction of the cylindrical battery cell 1 and surround part of the upper surface of the top cap 30. Accordingly, the crimping portion 22 fixes the periphery edge of the upper surface of the top cap 30. That is, the periphery edge area of the top cap 30 is fixed to the battery can 20 between the upper end of the crimping portion 22 and the beading portion 21, and covers the opening of the battery can 20.

Figure 10:
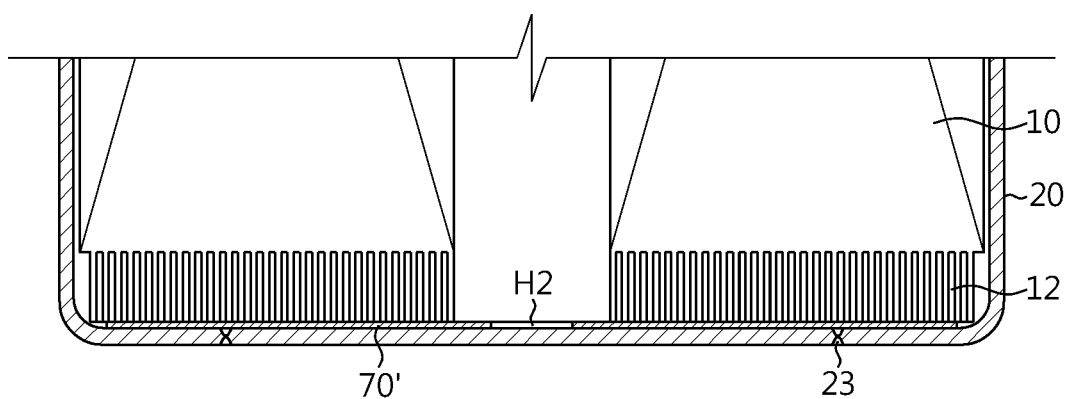
FIG. 10 is a partial cross-sectional view showing a lower part structure of a cylindrical battery cell according to an embodiment of the present disclosure.
Figure 11:
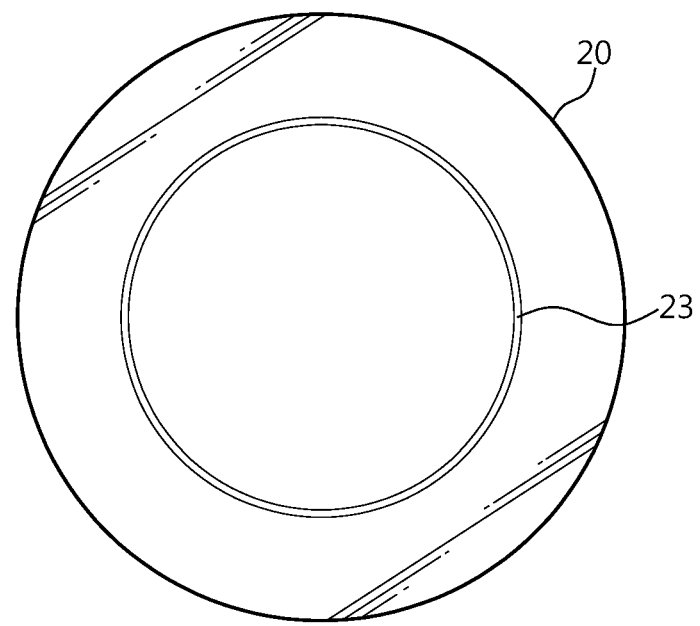
FIG. 11 is a bottom view of a cylindrical battery cell according to an embodiment of the present disclosure.

Referring to FIGS. 10 and 11, the battery can 20 may further include a venting portion 23 to prevent the increase in the internal pressure above a preset value due to gas generated within the battery can 20. The venting portion 23 may be provided in the closed portion formed at the lower end of the battery can 20. The venting portion 23 corresponds to a more vulnerable area than any other area in the closed portion formed at the lower end of the battery can 20. For example, the venting portion 23 may be configured to have a smaller thickness than the remaining area of the closed portion. Accordingly, when the internal pressure rises above the predetermined level due to a fault or defect in the cylindrical battery cell 1, the venting portion 23 ruptures to force the gas generated in the battery can 20 out. The cylindrical battery cell 1 according to the present disclosure has a structure in which both positive and negative electrode terminals are provided at the upper part as described below. Accordingly, with the venting portion 23 at the closed portion of the battery can 20 disposed on the side opposite to the positive and negative electrode terminals, it is possible to further improve safety. That is, according to the cylindrical battery cell 1 structure of the present disclosure, when the venting portion 23 ruptures to force venting gas out, the gas may be released in the direction opposite to the electrical connection components, for example, busbars. Accordingly, the cylindrical battery cell 1 of the present disclosure may reduce the risk related to the spread of an event caused by the direct contact between the electrical connection area of the busbars and the high temperature venting gas during venting. Additionally, the cylindrical battery cell 1 according to an embodiment of the present disclosure has a structure in which the positive and negative electrode terminals exist at the upper part as described above, so the upper structure is more complex than the lower structure. Accordingly, for smooth release of gas generated inside the battery can 20, the venting portion 23 may be preferably provided on the closed portion at the lower end of the battery can 20.

Although the drawing of the present disclosure shows the venting portion 23 continuously formed in an approximately circular shape at the closed portion of the battery can 20, the present disclosure is not limited thereto. The venting portion 23 may be discontinuously formed, and its shape may be approximately a straight line and/or a curve and/or an oval and/or any other geometrical shape.

Meanwhile, the venting portion 23 may have a partial reduction in thickness by notching the inner surface and/or the outer surface of the closed portion provided at the lower end of the battery can 20. That is, the venting portion 23 may be formed by one side notching or two side notching.

Referring to FIGS. 1 to 4, the top cap 30 is a component made of a metal material having conductive properties, and covers the top opening of the battery can 20. The top cap 30 is electrically connected to the first electrode tab 11 of the electrode assembly 10, and is electrically insulated from the battery can 20. Accordingly, the top cap 30 may act as a first electrode terminal of the cylindrical battery cell 1 of the present disclosure, having the first polarity that is the same as the first electrode tab 11 of the electrode assembly 10. The electrical connection between the first electrode tab 11 and the top cap may be made by, for example, the first current collector plate 70 and/or a lead 72.

The top cap 30 may be seated on the beading portion 21 formed in the battery can 20. The top cap 30 may be fixed by the crimping portion 22. That is, the edge periphery of the lower surface of the top cap 30 may be supported by the upper surface of the beading portion 21, and the edge periphery of the upper surface of the top cap 30 may be fixed by the upper bending of the crimping portion 22. Meanwhile, the sealing gasket 50 may be interposed between the top cap 30 and the crimping portion 22 of the battery can 20 to close the top opening of the battery can 20 and electrically insulate the battery can 20 from the top cap 30. The sealing gasket 50 may include a material having insulating and elastic properties. The sealing gasket 50 may include, for example, a polymer resin. The sealing gasket 50 may be bent along the bent shape of the crimping portion 22 of the battery can 20. When the battery can 20 includes the beading portion 21, the sealing gasket 50 may be interposed between the upper surface of the beading portion 21 and the upper end of the crimping portion 22. The top cap 30 may include a protrusion 31 that protrudes upwards from approximately the center thereof. The protrusion 31 may be provided at a location corresponding to a hole formed at approximately the center of the terminal extension member 40. The protrusion 31 may protrude above the upper surface of the terminal extension member 40 through the hole of the terminal extension member 40 as described below for easy contact with the electrical connection component, for example, busbars. However, the present disclosure is not limited thereto, and the top cap 30 may be flat as a whole. Additionally, when the top cap 30 includes the protrusion 31, the upper surface of the protrusion 31 may be disposed at a height that is approximately equal to or lower than the upper surface of the terminal extension member 40.

Figure 3A:
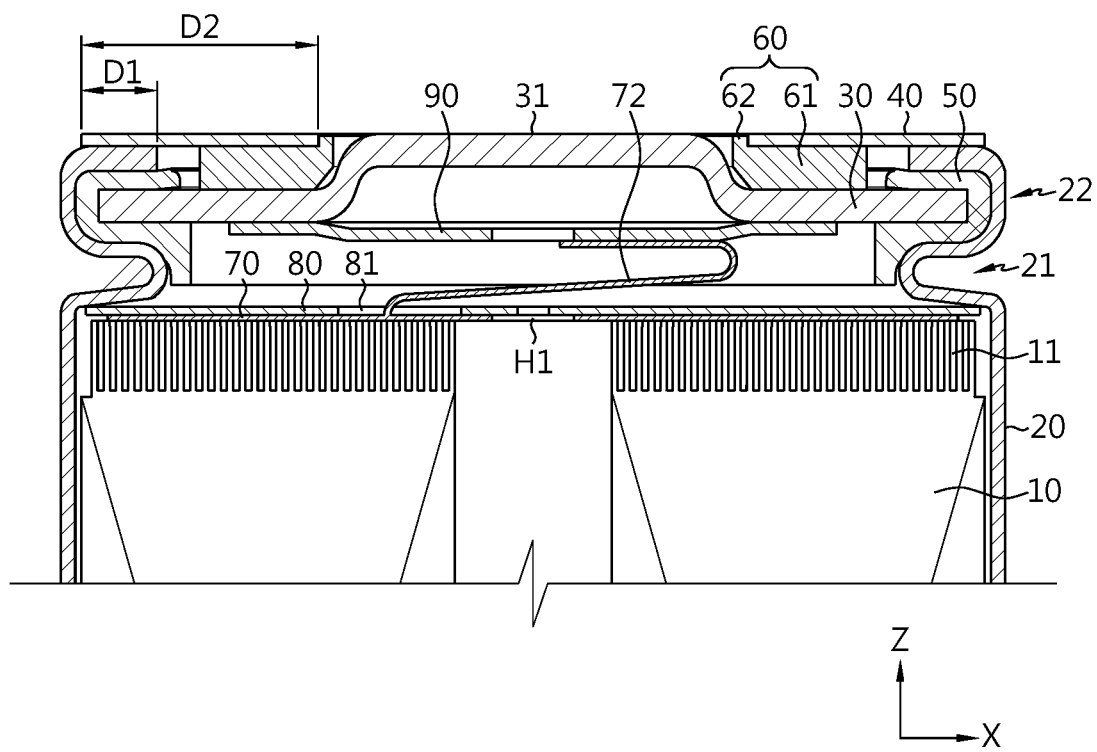

Referring to FIGS. 1 to 5, the terminal extension member 40 is made of a metal material having conductive properties. For example, the terminal extension member 40 may have an approximately disc shape having a hole formed at approximately the center thereof. That is, the terminal extension member 40 may be approximately in the shape of a washer having a hole at approximately the center. The terminal extension member 40 is coupled to the top of the battery can 20. The terminal extension member 40 is extended inwards along the radial direction of the cylindrical battery cell 1 from the top of the battery can 20. Accordingly, the terminal extension member 40 has a larger width than the flat portion formed on the top of the battery can 20. That is, the extended length of the terminal extension member 40 along the radial direction of the cylindrical battery cell 1 from the top of the battery can 20 is longer than the extended length of the flat portion formed on the top of the battery can 20 along the radial direction of the cylindrical battery cell 1. The flat portion formed on the top of the battery can 20 may be approximately parallel to the lower surface of the battery can 20. When the crimping portion 22 is formed on the top of the battery can 20, the terminal extension member 40 is coupled to the upper end of the crimping portion 22. Preferably, the flat portion that is approximately parallel to the closed portion of the battery can 20 may be formed at the upper end of the crimping portion 22. In this case, the terminal extension member 40 may be coupled on the flat portion formed on the upper end of the crimping portion 22. The coupling between the terminal extension member 40 and the crimping portion 22 may be made by, for example, laser welding. Referring to FIG. 3a, in the crimping portion 22, the flat portion coupled to the terminal extension member 40 may be configured to have a larger thickness than the remaining area of the crimping portion 22. In this case, it is possible to reduce the penetration risk of the crimping portion 22 even though the laser output is increased to a sufficient level for firm fixing in the process of fixing the terminal extension member 40 to the upper end of the crimping portion 22 through laser welding. Additionally, when the crimping portion 22 has a partial increase in thickness, it is possible to prevent the abnormal operation of the venting portion 23 due to the reduced sealability of the open side of the battery can 20 before the rupture of the venting portion 23 in case that the internal pressure of the cylindrical battery cell 1 increases.

The terminal extension member 40 is electrically insulated from the top cap 30. The top cap 30 is exposed through the hole formed at the center of the terminal extension member 40, and the terminal extension member 40 and the top cap 30 are spaced apart from each other.

When the top cap 30 includes the protrusion 31, the protrusion 31 may be exposed through the hole formed at approximately the center of the terminal extension member 40. In this case, the protrusion 31 is spaced apart from the inner surface of the hole formed in the terminal extension member 40, and the remaining area except the protrusion 31 of the top cap 30 is vertically spaced apart from the terminal extension member 40. Accordingly, the terminal extension member 40 has the second polarity that is the same as the second electrode tab 12 of the electrode assembly 10 and the battery can 20, and may act as a second electrode terminal of the cylindrical battery cell 1. That is, the cylindrical battery cell 1 according to an embodiment of the present disclosure has a structure in which both the first electrode terminal having the first polarity and the second electrode terminal having the second polarity are positioned in the same direction.

Referring to FIG. 3, the width D2 of the terminal extension member 40 is larger than the width D1 of the flat portion formed on the upper surface of the crimping portion 22 of the battery can 20. To this end, the terminal extension member 40 is extended from the upper surface of the crimping portion 22 to the radial center of the cylindrical battery cell 1. With the protrusion 31, the terminal extension member 40 is extended from the upper surface of the crimping portion 22 to the protrusion 31 of the top cap 30. This is to ensure a sufficient coupling area in the coupling of the electrical connection component to the top of the battery can 20 having the second polarity for the coupling of the connection component for electrical connection of the plurality of cylindrical battery cells 1 in a direction of the cylindrical battery cells 1. As the coupling area with the electrical connection component is sufficiently provided by the application of the terminal extension member 40, it is possible to smoothly perform the welding process, improve the coupling strength between the two components and reduce the electrical resistance at the coupled area.

Figure 5:
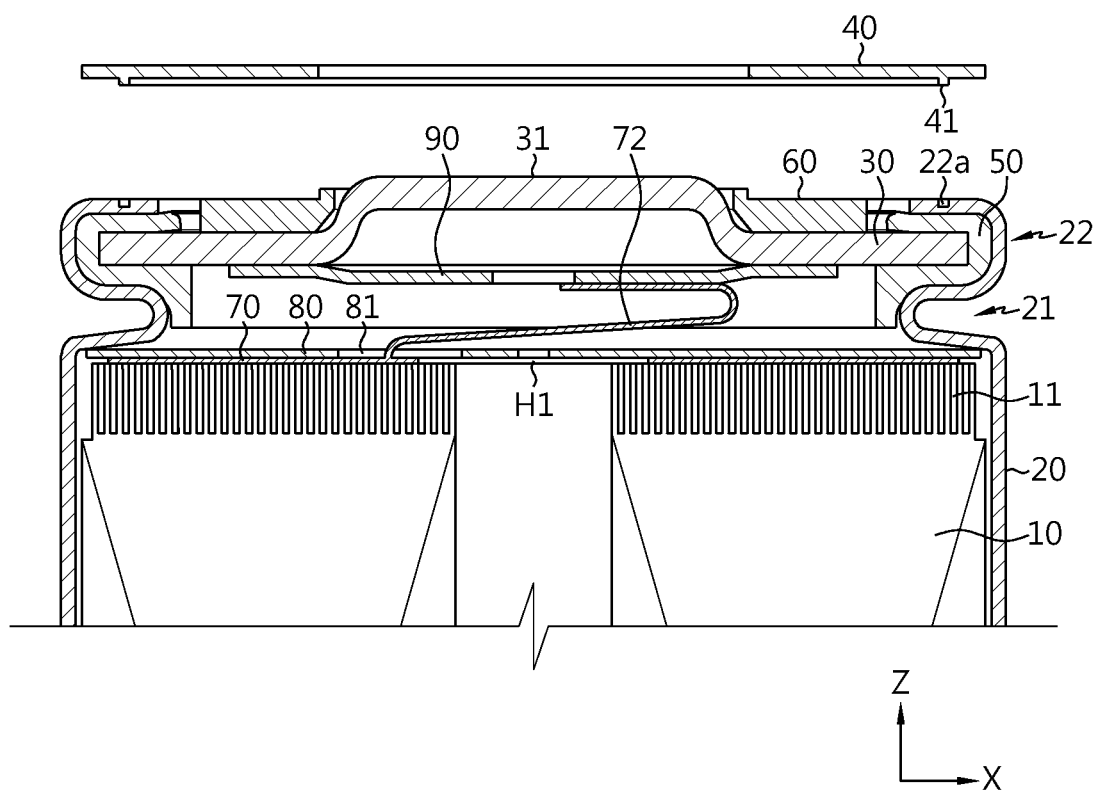

Meanwhile, referring to FIG. 5, the battery can 20 may include an insertion groove 22a formed on the upper surface of the crimping portion 22, and the terminal extension member 40 may include, on the lower surface thereof, an insertion protrusion 41 which has a shape corresponding to the insertion groove 22a and is coupled to the insertion groove 22a. On the contrary, the battery can 20 may include an insertion protrusion formed on the upper surface of the crimping portion 22, and the terminal extension member 40 may include an insertion groove which has a corresponding shape and is coupled to the insertion protrusion.

The insertion groove 22a and the insertion protrusion 41 may increase the contact area between the terminal extension member 40 and the crimping portion 22, thereby improving the coupling strength and reducing the electrical resistance at the coupled area. Additionally, the insertion groove 22a and the insertion protrusion 41 may guide the seating position of the terminal extension member 40 on the crimping portion 22, thereby preventing the contact between the terminal extension member 40 and the protrusion 31 of the top cap 30. Additionally, the insertion groove 22a and the insertion protrusion 41 may prevent the terminal extension member 40 from moving on the crimping portion 22 during the welding process, thereby improving workability.

Referring to FIGS. 2 and 3, the terminal insulation member 60 is interposed between the top cap 30 and the terminal extension member 40. The terminal insulation member 60 is made of a material having electrical insulation properties. For example, the terminal insulation member 60 may be approximately in the shape of a wash having a hole at approximately the center thereof.

In the cylindrical battery cell 1 according to an embodiment of the present disclosure, since the top cap 30 acts as the first electrode terminal having the first polarity and the terminal extension member 40 acts as the second electrode terminal having the second polarity that is opposite to the first polarity, the top cap 30 and the terminal extension member 40 need to maintain electrical insulation. Accordingly, it may be advantageous that the terminal insulation member 60 is applied to stably maintain the electrical insulation.

The terminal insulation member 60 is interposed between the lower surface of the terminal extension member 40 and the top cap 30. As described above, the terminal extension member 40 has a larger width D2 than the width D1 of the upper surface of the crimping portion 22, and is extended in a direction from the crimping portion 22 to the protrusion 31 of the top cap 30. Accordingly, the terminal insulation member 60 may be extended to cover the inner surface of the hole formed at the center of the terminal extension member 40 to prevent the contact between the inner surface of the hole formed at the center of the terminal extension member 40 and the protrusion 31 of the top cap 30.

For example, the terminal insulation member 60 may include a first part 61 interposed between the lower surface of the terminal extension member 40 and the upper surface of the top cap 30 (in case that the top cap 30 includes the protrusion 31, the upper surface of the remaining area except the protrusion 31), and a second part 62 that protrudes upwards from the first part 61 and is interposed between the inner surface of the hole formed at approximately the center of the terminal extension member 40 and the protrusion 31 of the top cap 30. In this case, the second part 62 may have the inner diameter corresponding to the outer diameter of the protrusion 31 of the top cap 30. This is to fix the terminal extension member 40 well without movement on the top cap 30. For example, the protrusion 31 may have the outer diameter that gradually decreases as it goes upwards. In this case, the inner diameter of the second part 62 corresponds to the outer diameter of the lower end of the protrusion 31, so that the terminal insulation member 40 may be naturally inserted into the protrusion 31.

Meanwhile, the hole formed at approximately the center of the terminal extension member 40 may have the inner diameter corresponding to the outer diameter of the second part 62 of the terminal insulation member 60. This is to fix the terminal extension member 40 well without movement on the terminal insulation member 60. As described above, when the terminal extension member 40 is fixed well on the terminal insulation member 60, it is possible to easily perform the welding process between the terminal extension member 40 and the crimping portion 22. Meanwhile, the upper surface of the terminal insulation member 60 (the upper surface of the first part 61) may be disposed at a height that is approximately equal to the upper surface of the crimping portion 22 formed at the upper end of the battery can 20. In this case, when the terminal extension member 40 is seated on the terminal insulation member 60, the lower surface of the terminal extension member 40 and the upper surface of the crimping portion 22 naturally come into contact with each other.

In case that the terminal insulation member 60 is made of a resin, the terminal insulation member 60 may be coupled to the terminal extension member 40 and the top cap 30 by heat fusion. In this case, it is possible to enhance sealability at the coupling interface between the terminal insulation member 60 and the terminal extension member and the coupling interface between the terminal insulation member 60 and the top cap 30.

Figure 4:
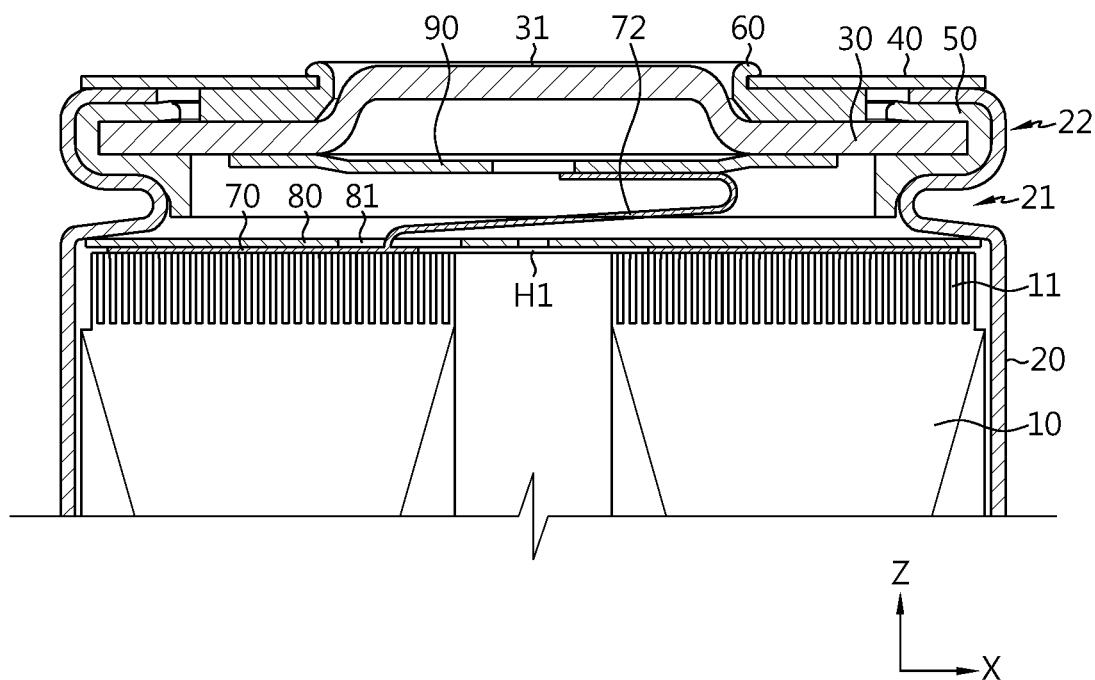

Referring to FIG. 4, the terminal insulation member 60 may be extended to cover part of the upper surface of the terminal extension member 40. That is, the second part 62 (see FIG. 3) of the terminal insulation member 60 may be further extended to cover not only the inner peripheral surface of the terminal extension member 40 but also the edge periphery of the upper surface of the terminal extension member 40. In this case, it is possible to further improve the contact prevention effect between the terminal extension member 40 and the top cap 30.

When the terminal insulation member 60 is extended to the edge area of the upper surface of the terminal extension member 40, it is possible to perform the process of seating the terminal extension member 40 on the crimping portion 22 more accurately and rapidly. After the terminal insulation member 60 is inserted into the hole formed at the center of the terminal extension member 40 and fixed to the terminal extension member 40, when the assembly of the terminal extension member 40 and the terminal insulation member 60 is seated on the crimping portion 22 and the top cap 30, the terminal extension member 40 may be naturally seated at an exact position. In this instance, the protrusion 31 of the top cap 30 may be exposed upward through the hole formed at approximately the center of the terminal insulation member 60.

The assembly of the terminal insulation member 60 and the terminal extension member 40 shown in FIG. 4 may be manufactured by insert molding. That is, the assembly of the terminal insulation member 60 and the terminal extension member 40 may be manufactured by insert molding to insert/fix the terminal extension member 40 made of a metal to the terminal insulation member 60 made of a resin, and when the assembly is positioned on the crimping portion 22 and the top cap 30, alignment may be naturally accomplished.

Meanwhile, in the present disclosure, the insulation between the terminal extension member 40 and the top cap 30 may be achieved by a method of applying the terminal insulation member 60 as well as any other method. For example, an insulating coating layer may be formed in an area of contact of the terminal extension member 40 with the top cap 60. On the contrary, the insulating coating layer may be formed in an area of contact of the top cap 60 with the terminal extension member 40. Besides, the insulation may be achieved by a sufficient gap between the terminal extension member 40 and the top cap 30 to prevent the contact risk between the two components.

Referring to FIGS. 2 to 4, the first current collector plate 70 is coupled on the electrode assembly 10. The first current collector plate 70 may be disposed between the electrode assembly 10 and the beading portion 21. The first current collector plate 70 is made of a metal having conductive properties, and is coupled to the first electrode tab 11. The first current collector plate 70 is electrically connected to the top cap 30. The lead 72 may be connected to the first current collector plate 70, and the lead 72 may be extended upwards and directly coupled to the top cap 30, or may be coupled to the connecting plate 90 coupled to the lower surface of the top cap 30. Accordingly, the top cap 30 may have the first polarity that is the same as the first electrode tab 11, and may act as the first electrode terminal.

Figure 6:
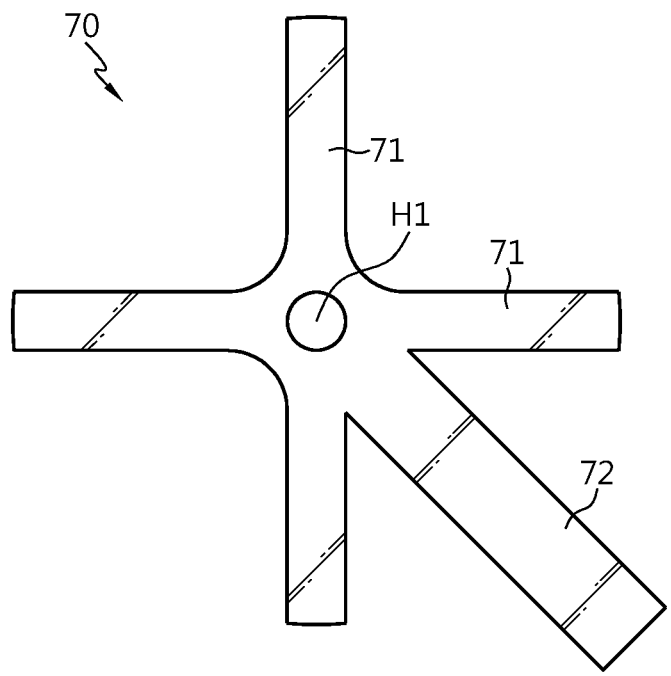
FIGS. 6 and 7 are diagrams showing a first current collector plate applied to the present disclosure.
Figure 7:
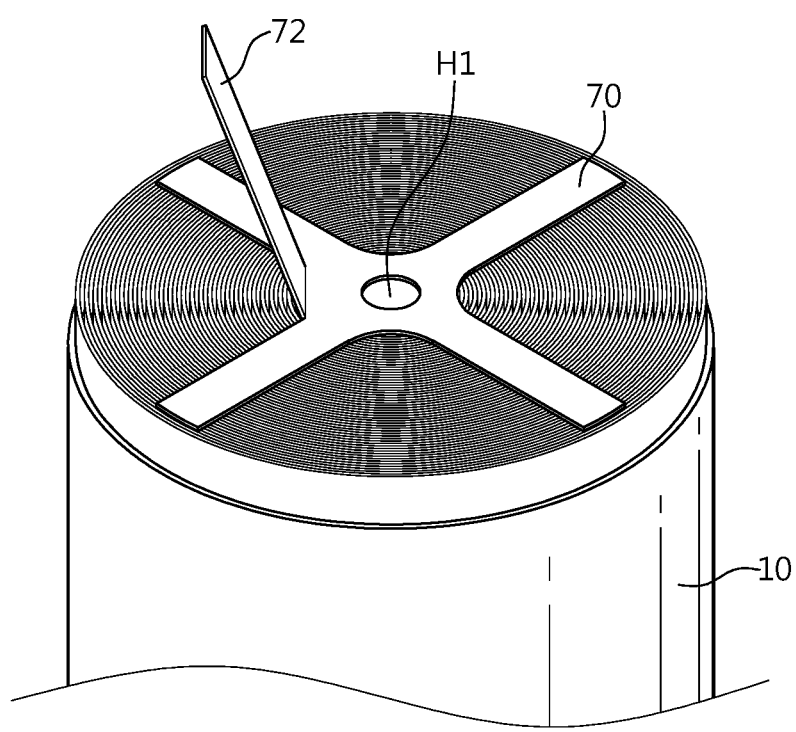

Referring to FIGS. 6 and 7, the first current collector plate 70 may include a plurality of tab coupling portions 71 that extend radially from the center. The gap between the adjacent tab coupling portions 71 may be used as a space for electrolyte solution injection. The first current collector plate 70 and the lead 72 may be integrally formed. In this case, in the same way as the tab coupling portions 71, the lead 72 may be in the shape of an elongated plate that extends outwards from the center of the first current collector plate 70. The lead 72 may be provided, for example, between the adjacent tab coupling portions 71. However, the structure of the first current collector plate 70 of the present disclosure is not limited thereto, and may have a shape corresponding to the upper surface of the electrode assembly 10 to cover the entire upper part of the first electrode tab 11.

The first current collector plate 70 may have a first current collector plate hole H1 at approximately the center thereof. The first current collector plate hole H1 may be provided at a location corresponding to the hole formed at the winding center C of the electrode assembly 10. The first current collector plate hole H1 may be used as a space for electrolyte solution injection and laser irradiation for welding between the second current collector plate 70' and the bottom surface of the battery can 20 or a space for insertion of a tool for ultrasonic welding. Taking the function of the first current collector plate hole H1 into account, the diameter of the first current collector plate hole H1 may be approximately equal to or larger than the diameter of the hole formed at the winding center C of the electrode assembly 10.

The maximum outer diameter (double the distance from the center to the end of the tab coupling portion 71) of the first current collector plate 70 may be approximately equal to or smaller than the minimum inner diameter (the inner diameter of the battery can at the location at which the beading portion 21 is formed) of the battery can 20. In this case, it is possible to prevent damage that may occur when the electrode assembly 10 is directly pressed by the beading portion 22 or the first current collector plate 70 is pressed by the electrode assembly 10 in the sizing process of adjusting the total height of the cylindrical battery cell 1.

Although not shown in the drawing, the first current collector plate 70 may include a plurality of concave-convex patterns formed radially on the lower surface thereof. When the concave-convex patterns are formed, the concave-convex patterns may be stamped to the electrode tabs 11, 12 by pressing the first current collector plate 70.

Figure 8:
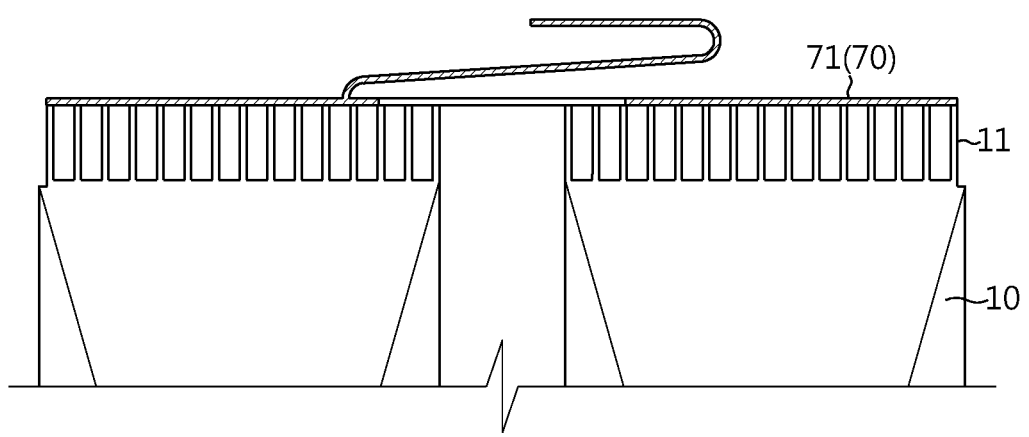
FIGS. 8 and 9 are cross-sectional views showing a connection structure of a first current collector plate and an electrode assembly applied to the present disclosure.

Referring to FIG. 8, the first current collector plate 70 is coupled to the end of the first electrode tab 11. For example, the coupling between the first electrode tab 11 and the first current collector plate 70 may be accomplished by laser welding. The laser welding may be performed by partially melting the base material of the first current collector plate 70, and may be performed with solder for welding interposed between the first current collector plate 70 and the first electrode tab 11. In this case, the solder may have a lower melting point than the first current collector plate 70 and the first electrode tab 11.

Figure 9:
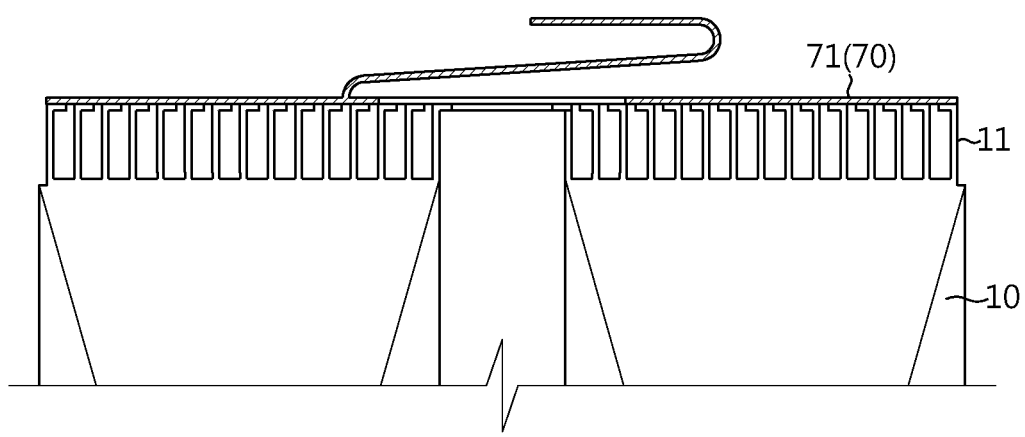

Referring to FIGS. 9, the first current collector plate 70 may be coupled on a coupling surface formed by the end of the first electrode tab 11 bent in a direction parallel to the first current collector plate 70. For example, the bending direction of the first electrode tab 11 may be a direction toward the winding center of the electrode assembly 10. When the first electrode tab 11 has a bent shape as described above, the space occupied by the first electrode tab 11 reduces, resulting in the improved energy density. Specifically, as described above with reference to FIG. 12, the first electrode tab 11 of the present disclosure may have the plurality of first segments 11a. The plurality of first segments 11a may be bent along the radial direction of the electrode assembly 10. The first segments 11a bent in a direction may overlap in multilayer. Along a direction from the outer peripheral surface of the electrode assembly 10 to the winding center C or the opposite direction, there is an area in which the number of overlapping layers of the first segments 11a is at the maximum and is approximately uniformly maintained. That is, the first electrode tab 11 includes an area in which the number of overlapping layers by the bending of the first segments 11a is approximately uniformly maintained. The first current collector plate 70 may be coupled to the first electrode tab 11 in a target weld area in which the number of overlapping layers is uniformly maintained.

Referring to FIG. 10, the second current collector plate 70' may be coupled to the lower surface of the electrode assembly 10. The second current collector plate 70' is electrically connected to the second electrode tab 12 of the electrode assembly 10 and the battery can 20. One surface of the second current collector plate 70' may be coupled to the second electrode tab 12 of the electrode assembly 10, for example, by welding, and the opposite surface may be coupled on the inner bottom surface of the battery can 20, i.e., on the inner surface of the closed portion, for example, by welding. The coupling structure between the second current collector plate 70' and the second electrode tab 12 coupled to the lower surface of the electrode assembly 10 may be substantially the same as the above-described coupling structure between the first current collector plate 70 and the first electrode tab 11.

Although not shown in the drawings, in the same way as the first electrode tab 11, the second electrode tab 12 may also include the second segments (not shown), and the second segments may be also bent along the radial direction of the electrode assembly 10. In this case, there is a target weld area, in which the number of overlapping layers of the second segments is uniformly maintained approximately to the maximum, along the radial direction of the electrode assembly 10. The second current collector plate 70' may be coupled to the second electrode tab 12 in the target weld area.

Meanwhile, the second current collector plate 70' may have a second current collector plate hole H2 at approximately the center thereof. In this case, the second current collector plate hole H2 may be formed at a location corresponding to the hole formed at the winding center C of the electrode assembly 10. Preferably, the second current collector plate hole H2 has a diameter that is approximately equal to or smaller than the hole at the winding center C of the electrode assembly 10. This is for laser irradiation above from the electrode assembly 10 or inserting a welding rod and welding the second current collector plate 70' to the bottom surface of the battery can 20.

The insulator 80 is positioned between the upper end of the electrode assembly 10 and the beading portion 21 or between the current collector plate 70 coupled on the electrode assembly 10 and the beading portion 21 to prevent the contact between the first electrode tab 11 and the battery can 20 or the contact between the first current collector plate 70 and the battery can 20. The insulator 80 may be also interposed between the first electrode tab 11 of the electrode assembly 10 and the inner peripheral surface of the battery can 20.

The insulator 80 has a lead hole 81, and the lead 72 extending upward from the first current collector plate 70 or the first electrode tab 11 extends out of the lead hole 81. The lead 72 is extended upwards through the lead hole 81 and coupled to the lower surface of the connecting plate 90 or the lower surface of the top cap 30.

As described above, the cylindrical battery cell 1 according to an embodiment of the present disclosure has a structure in which the top cap 30 and the terminal extension member 40 provided on one side of the battery can 20 in the lengthwise direction (the direction parallel to the Z axis in FIG. 2) may be used as the first electrode terminal and the second electrode terminal, respectively. Accordingly, in electrically connecting a plurality of cylindrical battery cells 1 according to an embodiment of the present disclosure, it is possible to place the electrical connection component such as busbars on only one side of the cylindrical battery cells 1, thereby simplifying the structure and improving the energy density.

Figure 13:
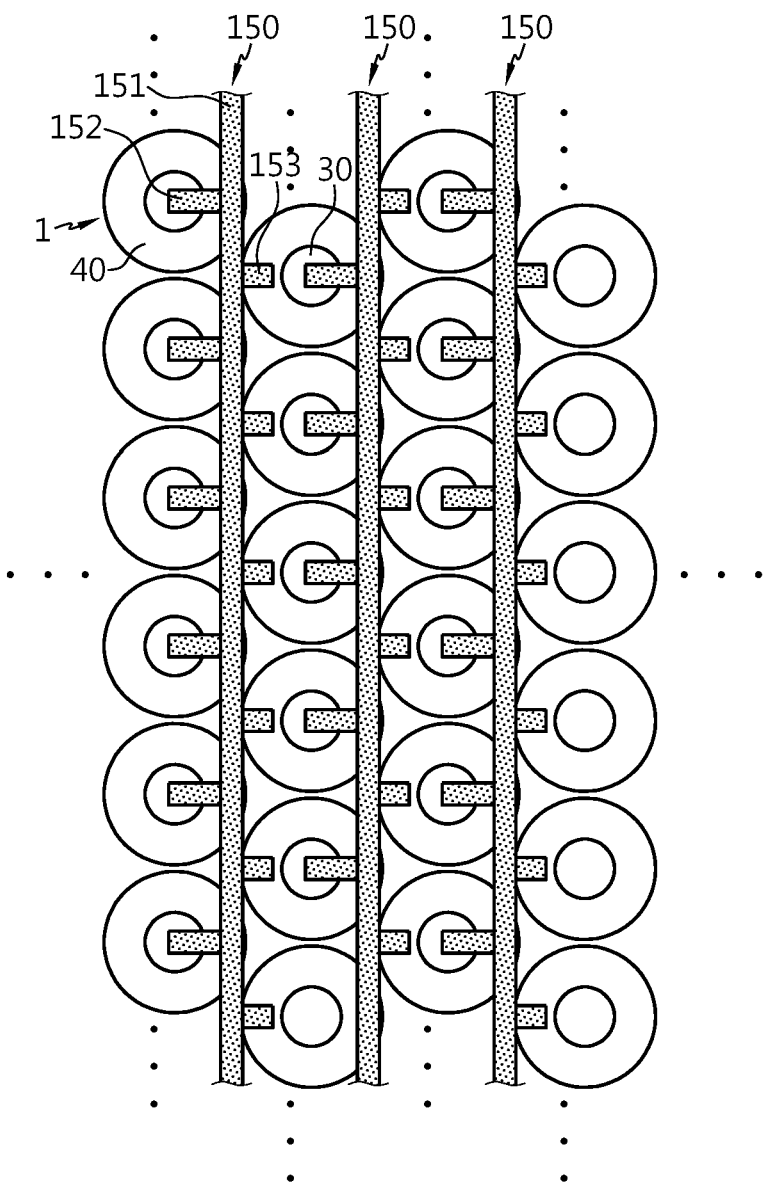
FIG. 13 is a top view of a plurality of cylindrical battery cells connected in series and in parallel using busbars according to an embodiment of the present disclosure.

Referring to FIG. 13, the plurality of cylindrical battery cells 1 may be connected either in series or in parallel or both at the upper part of the cylindrical battery cells 1 using the busbars 150. FIG. 13 shows the plurality of cylindrical battery cells 1 connected in series and in parallel by way of illustration. The number of cylindrical battery cells 1 may be smaller or larger, taking the capacity of a battery pack into account.

In each cylindrical battery cell 1, the top cap 30 that acts as the first electrode terminal may have the positive polarity, and the terminal extension member 40 that acts as the second electrode terminal may have the negative polarity, or vice versa.

Preferably, the plurality of cylindrical battery cells 1 may be arranged in a plurality of columns and rows. The column is the vertical direction on the basis of FIG. 13, and the row is the horizontal direction when viewed on the basis of FIG. 13. Additionally, to maximize the space efficiency, the cylindrical battery cells 1 may be arranged in a closest packing structure. The closest packing structure is formed when a right triangle is formed by connecting the centers of the top caps 30. Preferably, the busbars 150 may be arranged on the plurality of cylindrical battery cells 1, and more preferably between the adjacent columns. Alternatively, the busbars 150 may be arranged between the adjacent rows.

Preferably, the busbars 150 may connect in parallel the cylindrical battery cells 1 arranged in the same column, and may connect in series the cylindrical battery cells 1 arranged in two adjacent columns.

Preferably, the busbar 150 may include a body 151, a plurality of first busbar terminals 152 and a plurality of second busbar terminals 153 for series and parallel connection. The body 151 may be extended between the centers of the top caps 30 of the adjacent cylindrical battery cells 1, and preferably between the columns of the cylindrical battery cells 1. Alternatively, the body 151 may be extended along the columns of the cylindrical battery cells 1, and for example, may be regularly bent in a zigzag pattern.

The plurality of first busbar terminals 152 may be extended from one side of the body 151 to the top cap 30 of each cylindrical battery cell 1, and electrically coupled to the center of the top cap 30 exposed through the center of the terminal extension member 40. The electrical coupling between the first busbar terminal 152 and the top cap 30 may be made, for example, by laser welding, ultrasonic welding or the like. Additionally, the plurality of second busbar terminals 153 may be extended from the other side of the body 151 to the terminal extension member 40 of each cylindrical battery cell 1, and electrically coupled to the terminal extension member 40. The electrical coupling between the second busbar terminal 153 and the terminal extension member 40 may be made, for example, by laser welding, ultrasonic welding or the like.

Preferably, the body 151, the plurality of first busbar terminals 152 and the plurality of second busbar terminals 153 may be formed of a single conductive metal plate. The metal plate may be, for example, an aluminum plate or a copper plate, and the present disclosure is not limited thereto. In a variation, the body 151, the plurality of first busbar terminals 152 and the plurality of second busbar terminals 153 may be fabricated as respective pieces and coupled to one another, for example, through welding.

Since the cylindrical battery cell 1 according to the present disclosure includes the top cap 30 having the first polarity and the terminal extension member 40 having the second polarity disposed in the same direction (an upward direction along the Z axis when viewed on the basis of the drawings of the present disclosure), it is possible to easily establish the electrical connection of the cylindrical battery cells 1 using the busbars 150.

Additionally, since the top cap 30 and the terminal extension member 40 of the cylindrical battery cell 1 have a large area, it is possible to ensure the sufficient coupling area of the busbars 150, thereby increasing the coupling strength of the busbars 150, and sufficiently reduce the resistance of the battery pack including the cylindrical battery cells 1.

Figure 14:
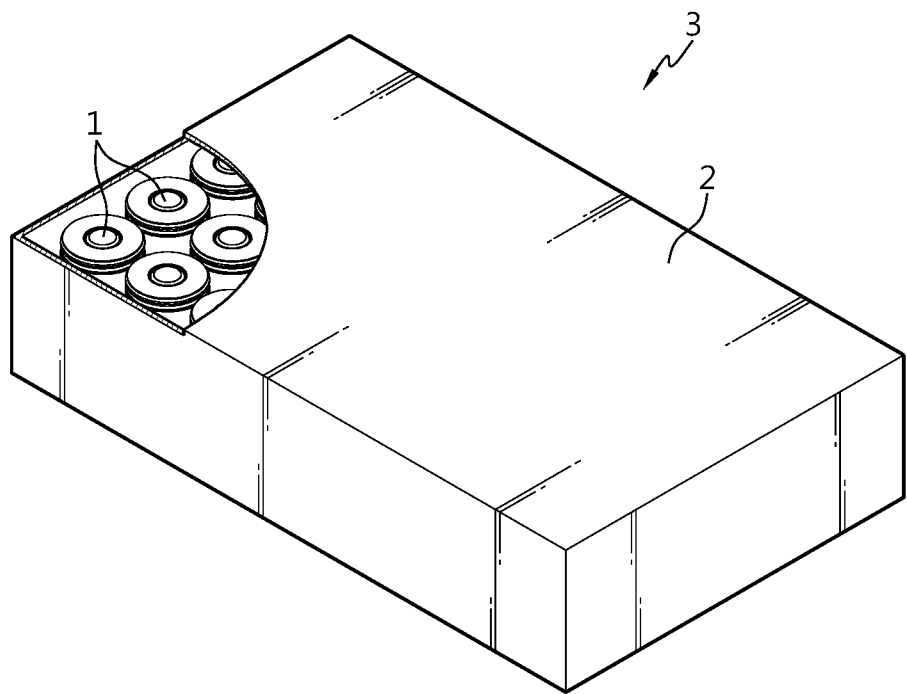
FIG. 14 is a schematic diagram showing a battery pack according to an embodiment of the present disclosure.

Referring to FIG. 14, the battery pack 3 according to an embodiment of the present disclosure includes a battery cell assembly including the plurality of cylindrical battery cells 1 according to an embodiment of the present disclosure as described above electrically connected to each other and a pack housing 2 to accommodate the secondary battery assembly. In the drawings of the present disclosure, components such as the busbars for electrical connection and power terminals are omitted for convenience of illustration. The electrical connection structure of the plurality of battery cells 1 for the fabrication of the battery pack 3 has been described above with reference to FIG. 12.

Figure 15:
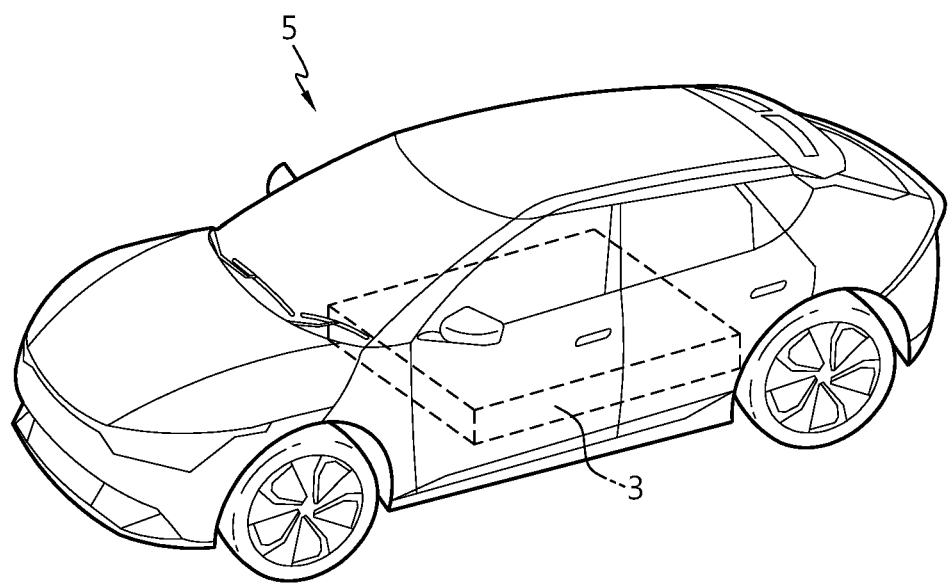
FIG. 15 is a conceptual diagram showing a vehicle according to an embodiment of the present disclosure.

Referring to FIG. 15, a vehicle 5 according to an embodiment of the present disclosure may be, for example, an electric vehicle, and includes the battery pack 3 according to an embodiment of the present disclosure. The vehicle 5 operates by the power supplied from the battery pack 3 according to an embodiment of the present disclosure.

While the present disclosure has been hereinabove described with regard to a limited number of embodiments and drawings, the present disclosure is not limited thereto and it is obvious to those skilled in the art that a variety of modifications and changes may be made thereto within the technical aspects of the present disclosure and the equivalent scope of the appended claims.

What is claimed is:

1. A cylindrical battery cell, comprising:
   an electrode assembly including a first electrode tab and a second electrode tab;
   a battery can configured to receive the electrode assembly therein, the battery can being electrically connected to the second electrode tab;
   a top cap configured to cover a top opening of the battery can, the top cap being electrically connected to the first electrode tab;
   a sealing gasket located between the top cap and the battery can such that the top cap is electrically insulated from the battery can;
   a terminal extension member coupled to a top of the battery can; and
   a terminal insulation member interposed between the top cap and the terminal extension member to electrically insulate the top cap from the terminal extension member.

2. The cylindrical battery cell according to claim 1, wherein the terminal extension member extends inward along a radial direction of the cylindrical battery cell at the top of the battery can.

3. The cylindrical battery cell according to claim 2, wherein the terminal extension member has a larger width than a flat portion formed by the top of the battery can.

4. The cylindrical battery cell according to claim 1, wherein the battery can includes a crimping portion extending inward along a radial direction of the cylindrical battery cell at an upper periphery of the battery can.

5. The cylindrical battery cell according to claim 4, wherein the terminal extension member is coupled to an upper surface of the crimping portion.

6. The cylindrical battery cell according to claim 4, wherein a flat portion is provided on an upper surface of the crimping portion, and
   wherein the terminal extension member is coupled on the flat portion of the crimping portion.

7. The cylindrical battery cell according to claim 6, wherein the terminal extension member has a larger width than a width of the flat portion of the crimping portion.

8. The cylindrical battery cell according to claim 1, wherein the terminal extension member has a shape of a washer having a hole at a center thereof.

9. The cylindrical battery cell according to claim 8, wherein the top cap includes a protrusion protruding upwards from the center, and
   wherein the protrusion is provided at a location corresponding to the hole formed at the center of the terminal extension member.

10. The cylindrical battery cell according to claim 9, wherein the protrusion protrudes upwards above an upper surface of the terminal extension member.

11. The cylindrical battery cell according to claim 1, wherein the terminal insulation member has a shape of a washer having a hole at a center thereof.

12. A cylindrical battery cell, comprising:
    an electrode assembly including a first electrode tab and a second electrode tab;
    a battery can configured to receive the electrode assembly therein, the battery can being electrically connected to the second electrode tab;
    a top cap configured to cover a top opening of the battery can, the top cap being electrically connected to the first electrode tab and electrically insulated from the battery can;
    a terminal extension member coupled to a top of the battery can, the terminal extension member being electrically insulated from the top cap; and a terminal insulation member interposed between the top cap and the terminal extension member to electrically insulate the top cap from the terminal extension member, wherein the top cap includes a protrusion protruding upwards from the center, and wherein the terminal insulation member has a shape of a washer having a hole at a center thereof, the terminal insulation member including:
- a first part interposed between a lower surface of the terminal extension member and an upper surface of a remaining area of the top cap except the protrusion in the top cap; and
- a second part protruding upwards from the first part, the second part being interposed between an inner surface of the hole formed at the center of the terminal extension member and the protrusion.

13. The cylindrical battery cell according to claim 12, wherein the battery can includes a crimping portion extending inward along a radial direction of the cylindrical battery cell at an upper periphery of the battery can, and
    wherein an upper surface of the first part is disposed at a same height as an upper surface of the crimping portion.

14. The cylindrical battery cell according to claim 12, wherein the second part has an inner diameter corresponding to an outer diameter of the protrusion.

15. The cylindrical battery cell according to claim 14, wherein the outer diameter of the protrusion gradually decreases as it goes upwards, and
    wherein the inner diameter of the second part corresponds to the outer diameter of a lower end of the protrusion.

16. The cylindrical battery cell according to claim 12, wherein the terminal extension member has an inner diameter corresponding to an outer diameter of the second part.

17. The cylindrical battery cell according to claim 6, wherein a thickness of the crimping portion at an area having the flat portion is larger than a thickness at a remaining area of the crimping portion.

18. The cylindrical battery cell according to claim 12, wherein the second part is extended to cover part of the upper surface of the top cap.

19. The cylindrical battery cell according to claim 18, wherein the terminal extension member and the terminal insulation member are an assembly formed by insert molding.

20. The cylindrical battery cell according to claim 4, wherein an upper surface of the crimping portion has an insertion protrusion or an insertion groove, and
    wherein a lower surface of the terminal extension member has an insertion groove coupled to the insertion protrusion of the crimping portion or an insertion protrusion coupled to the insertion groove of the crimping portion.

21. The cylindrical battery cell according to claim 1, wherein the terminal insulation member includes a resin material, and the terminal insulation member is coupled to the terminal extension member and the top cap by heat fusion.

22. The cylindrical battery cell according to claim 1, wherein the electrode assembly has a jellyroll structure in which a stack is wound in a winding direction, the stack including a first electrode, a second electrode, and a separator interposed between the first electrode and the second electrode.

23. The cylindrical battery cell according to claim 22, wherein the first electrode tab is a first noncoated region in which an electrode active material is not coated at an upper end of the first electrode, and
    wherein the second electrode tab is a second noncoated region in which an electrode active material is not coated at a lower end of the second electrode.

24. The cylindrical battery cell according to claim 23, wherein at least part of the first electrode tab includes a plurality of first segments split along the winding direction of the electrode assembly.

25. The cylindrical battery cell according to claim 24, wherein the plurality of first segments is bent along a radial direction of the electrode assembly.

26. The cylindrical battery cell according to claim 25, further comprising a first current collector plate coupled to the electrode assembly and electrically connected to the top cap,
    wherein the first current collector plate is coupled to a coupling surface formed by the bending of the plurality of first segments.

27. The cylindrical battery cell according to claim 26, wherein the plurality of first segments overlap in multiple layers,
    wherein the first electrode tab includes a target weld area in which a number of overlapping layers of the plurality of first segments is uniformly maintained along the radial direction of the electrode assembly, and
    wherein the first current collector plate is coupled to the first electrode tab in the target weld area.

28. The cylindrical battery cell according to claim 1, further comprising a first current collector plate coupled to the electrode assembly and electrically connected to the top cap.

29. The cylindrical battery cell according to claim 28, wherein the first current collector plate includes a plurality of tab coupling portions extended radially from a center thereof.

30. The cylindrical battery cell according to claim 29, wherein the first current collector plate further includes a lead between two adjacent tab coupling portions to electrically connect the first current collector plate to the top cap.

31. The cylindrical battery cell according to claim 28, wherein the battery can includes a beading portion press-fit along a periphery of an outer peripheral surface thereof, and
    wherein the first current collector plate is disposed between the electrode assembly and the beading portion.

32. The cylindrical battery cell according to claim 31, wherein a maximum outer diameter of the first current collector plate is equal to or smaller than an inner diameter of the battery can at a height at which the beading portion is formed.

33. The cylindrical battery cell according to claim 28, wherein the first current collector plate has a first current collector plate hole formed at a location corresponding to a hole formed at a winding center of the electrode assembly.

34. The cylindrical battery cell according to claim 33, wherein a diameter of the first current collector plate hole is equal to or larger than a diameter of the hole formed at the winding center of the electrode assembly.

35. The cylindrical battery cell according to claim 1, wherein the battery can includes a closed portion located at a lower end opposite the top opening, and
    wherein the closed portion includes a venting portion configured to rupture when an internal pressure of the battery can increases above a reference value.

36. The cylindrical battery cell according to claim 35, wherein the venting portion is configured to have a smaller thickness than a surrounding area of the closed portion.

37. The cylindrical battery cell according to claim 36, wherein the venting portion is formed by notching one or opposite surfaces of the closed portion.

38. The cylindrical battery cell according to claim 31, further comprising an insulator interposed between the beading portion and the first current collector plate.

39. The cylindrical battery cell according to claim 38, wherein the insulator is interposed between the first electrode tab of the electrode assembly and an inner peripheral surface of the battery can.

40. A battery pack comprising a plurality of cylindrical battery cells according to claim 1.

41. The battery pack according to claim 40, wherein the plurality of cylindrical battery cells is arranged in a predetermined number of columns, and
   wherein the top cap and the terminal extension member provided in each cylindrical battery cell are positioned upwards.

42. The battery pack according to claim 41, comprising:
   a plurality of busbars to connect the plurality of cylindrical battery cells in series and in parallel,
   wherein the plurality of busbars is positioned on the plurality of cylindrical battery cells, and
   wherein each busbar includes:
      a body extending between adjacent cylindrical battery cells;
      a plurality of first busbar terminals extending in a first direction from the body and electrically coupled to the top caps of the cylindrical battery cells disposed in the first direction; and
      a plurality of second busbar terminals extending in a second direction opposite the first direction from the body and electrically coupled to the terminal extension members of the cylindrical battery cells disposed in the second direction.

43. A vehicle comprising at least one battery pack according to claim 40.

* * * * *